June 28, 1932.  J. E. JEWETT ET AL  1,864,825
AGITATED APPARATUS
Filed March 27, 1926   3 Sheets-Sheet 1
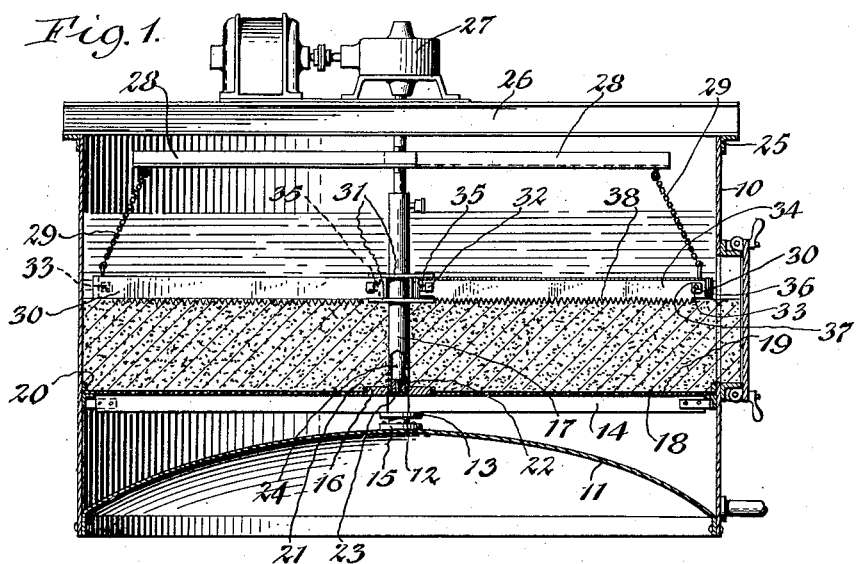
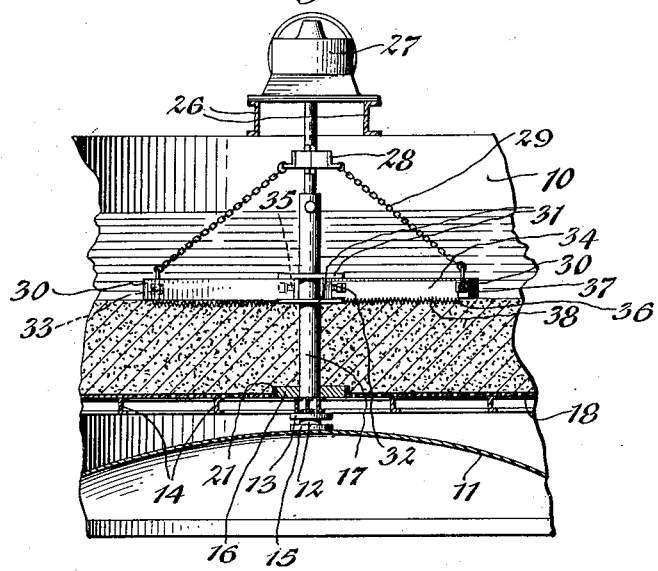
Inventors
J. E. JEWETT.
C. C. HERITAGE.
R. RIEGLER.
by William J. Karaleke
Attorney

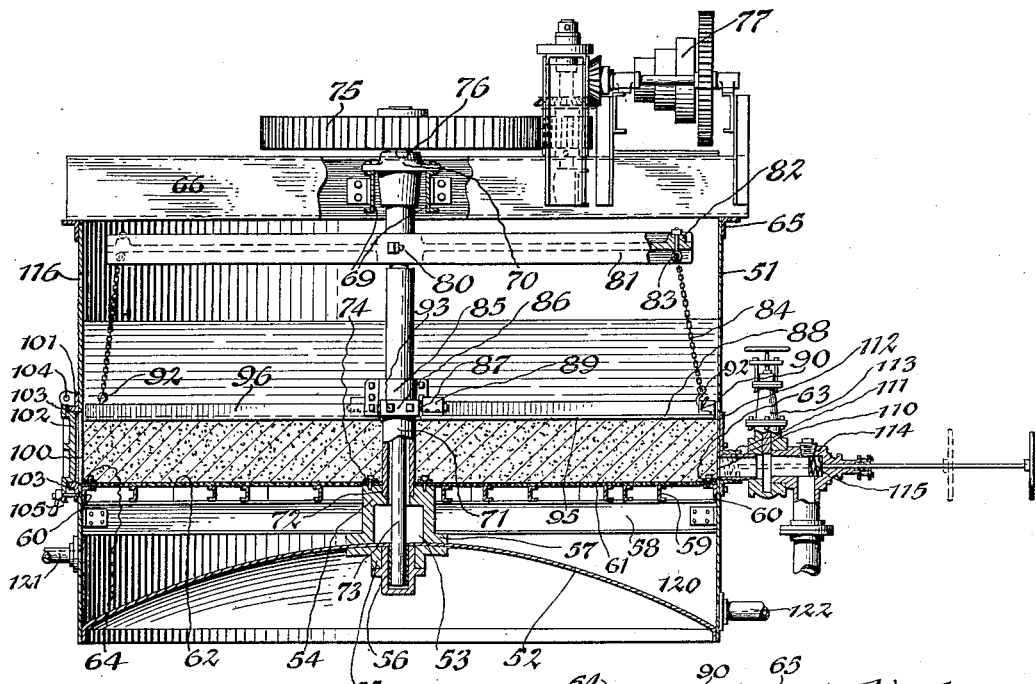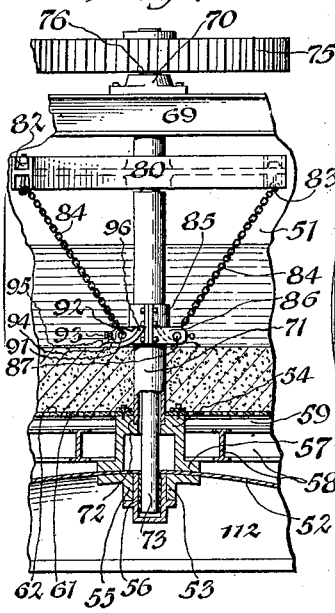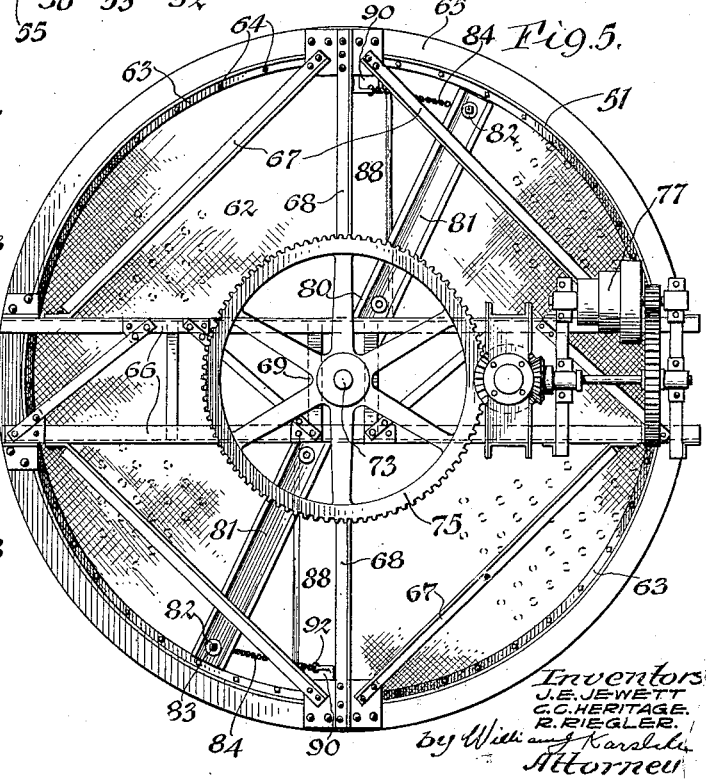

June 28, 1932.  J. E. JEWETT ET AL  1,864,825
AGITATED APPARATUS
Filed March 27, 1926   3 Sheets-Sheet 3

Inventors
J.E. JEWETT.
C.C. HERITAGE.
R. RIEGLER.
by William J Carslake
Attorney Patented June 28, 1932

1,864,825

UNITED STATES PATENT OFFICE

JOSEPH E. JEWETT, CLARK C. HERITAGE, AND RIEWEN RIEGLER, OF BUFFALO, NEW YORK, ASSIGNORS TO NATIONAL ANILINE & CHEMICAL CO., INC., OF NEW YORK, N. Y., A CORPORATION OF NEW YORK

AGITATED APPARATUS

Application filed March 27, 1926. Serial No. 97,982.

This invention relates to apparatus having agitating means functioning both to distribute or level solids deposited from a liquid suspension and also to disintegrate or stir such solids. More particularly, it relates to filters of the Nutsch or false-bottom type in which an agitator of the type indicated levels or smooths precipitate deposited on a filtering medium and, after a filtering operation, acts to break up the cake.

According to the present invention an agitator structure is provided that slides on a central shaft, has bars or blades that extend in a generally radial direction, and is rotated preferably by flexible means, such as chains, secured to the free ends of the bars. Each bar incorporates both a drag to compact and level the precipitate, and a scraper to disintegrate the cake. According to the preferred embodiment, one side of the agitator blade is formed for producing a dragging and compacting action and another side is formed for producing a scraping action, the direction of rotation determining which operation occurs, and a reversal of the direction of rotation automatically accomplishing a change from one action to the other.

In the accompanying drawings which illustrate the invention for the purposes of disclosure, Fig. 1 is a vertical section of an embodiment of the invention showing a filter of the Nutsch type equipped with an agitator;

Fig. 2 is a partial sectional view in a plane perpendicular to that of Fig. 1;

Figs. 3 and 4 are similar views of a modified embodiment;

Fig. 5 is a top view of the modified form;

Figure 6:
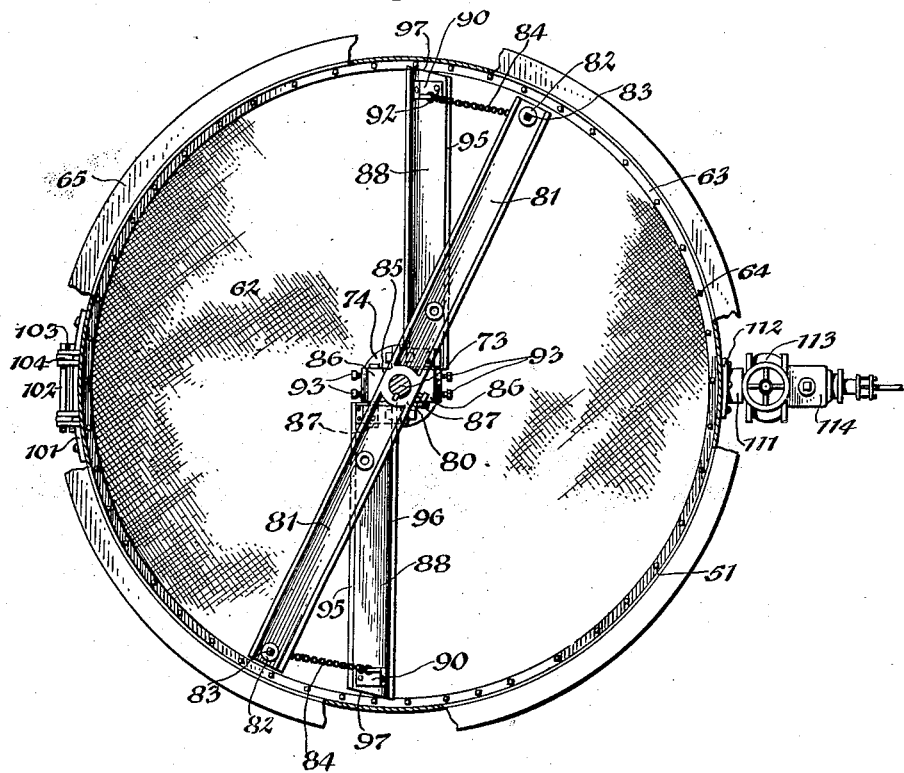
Fig. 6 is a plan view of the modified form with the superstructure removed.

In the embodiment shown in Figs. 1 and 2, a cylindrical steel shell 10 has an upwardly convexed bottom 11 supporting a flanged pedestal 12 at its center. The upward convexity of the bottom gives a rigid support for the pedestal and also forms a chamber whose lowest portion is at the periphery. The upper flange 13 of the pedestal supports radially disposed channel beams 14, whose outer ends are riveted to the shell, while the lower flange 15 rests on the convexed bottom. A flat ring 16 is riveted on the inner ends of the beams, and it is tapped to receive a pipe or hollow column 17. The beams support a perforated plate 18 and filter cloth 19, and rings 20 and 21 secure the cloth in place. Fitted within the column is a bearing 22 resting on a plate 23, and a vertical shaft 24 has its lower end journaled in the bearing.

A circumferentially placed angle bar 25 forms the upper edge of the shell, and on this rest beams 26 supporting a driving mechanism 27 for the shaft 24. The column 17 does not extend the full height of the shaft and horizontally extending arms 28 are clamped on the exposed portion, the shaft having a square section for this purpose. Depending chains 29 are secured to the extremities of these arms. The lower ends of the chains are hooked to the outer ends of agitator bars 30, here shown as wooden beams, whose inner ends are connected by plates 31. These plates are bored to have a sliding fit on the column 17, and the agitator is thus secured in rotating relation to the column. On the inner end of one side of each bar there is a headed lag screw 32 and on the outer end of the same side is a stud 33. A cast iron plate 34 has a slot 35 at one end to fit on the lag screw 32 and a hole 36 at the other end that slips over the stud 33; a nut 37 screws on the stud to hold the plate in place on the agitator bar. The plate is of a width to project below the bar when mounted thereon, and the lower edge may have teeth 38.

The operation of this embodiment relies upon the wooden beams of the agitator, the plates being removed, to float on the surface as slurry is poured in. When it is desired to smooth or level the surface of the cake deposited on the filter cloth the beams are rotated by means of the chains, arms and rotating shaft. After the cake has been deposited, the agitator can be used to drag and level the cake and close up any cracks or breaks that may form. When it is desired to remove the cake or to reform a slurry with liquid, the toothed plates are attached to the agitator bars and, as they are rotated, their weight causes them to cut into the cake and disintegrate it.

The modification, shown in Figs. 3 to 6 inclusive, is likewise a cylindrical shell 51 with an upwardly convexed bottom 52 supporting a bearing member 53 at its center. The member 53 comprises a flanged upper element 54 and a lower element 55 to which is attached a bushing 56. Secured to the flange 57 of the upper element are radially disposed I beams 58 whose outer ends are riveted to the shell 51. Small channel beams 59 are tangentially disposed upon the I beams and these, together with a ring 60 of angle iron riveted to the shell, in turn support a perforated plate 61. A filter cloth 62 rests on the plate, and a ring 63, fitted within the shell periphery and held by screws 64 to the ring 60, secures the outer edge of the filter cloth and the perforated plate.

An angle bar 65 forms the upper edge of the shell 51 and supports a pair of suitably braced I beams 66. These I beams are fixed in position by diagonal members 67 and cross members 68 secured to the circular bar 65. Channel beams 69 extend between the I beams 66, and on these rests a bearing member 70.

The element 54 also carries a tubular column 71 fitting in a socket 72 formed in the element. A shaft 73 extends within the column with its lower end journaled in the bushing 56, and its upper portion projecting above the column is supported in the bearing 70. About the column 71 is a ring 74 fastened to the element 54 for securing the inner edge of the filter cloth and the perforated plate.

The upper end of the shaft 73 is secured within a gear wheel 75 which rests on the member 70 with an interposed fiber washer 76. A belt driven transmission mechanism 77 is supported on the I beams 66 and in mesh with the gear 75.

The column 71 does not extend upwardly as far as does the member 70, and on the exposed portion of the shaft 73 is keyed and further secured by set screws a member 80 having drag arms 81 extending therefrom. A boss 82 on the extremity of each arm is drilled to receive an eye bolt 83, and a chain 84 depends from the eye bolt.

A collar 85 is slidably mounted on the column 71. The collar is in half sections bolted together, and from each section there extends a lug 86 supporting a pintle 87, the pintles extending in opposite tangential directions, and being held securely in the lugs by set screws 93.

A blade 88 has a socket 89 riveted to it at one end, to accommodate a pintle 87 along a longitudinal line of the blade, and has a plate 90 with an eye 91 secured to the other or outer end for receiving a hook 92 on the chain 84. The blade socket 89 is tapped to receive set screws and is so made to fit upon its pintle 87 that it adjustably pivots thereon, the angular adjustment of the blade upon its pintle depending upon the type of material being filered. Set screws or their equivalent hold the blade from rotation on the pintle. The blade has a horizontal flat bottom portion 94 with a beveled edge 95 for producing a scraping action, and a rounded edge and an upwardly curved portion 96 for riding over and compacting the cake. Because of the displacement of the blade from a radial line, when mounted on its pintle, the outer end 97 of the blade is biased to accommodate the wall of the vessel. The mounting of the blades on the pintles is such that in one direction of rotation the curved portion of each blade is leading, while in the opposite direction of rotation the flat edge of each blade is presented. Thus the blade produces a dragging action upon being rotated in one direction and a scraping action upon being rotated in the reverse direction, the action automatically reversing itself with a reversal of the direction of rotation of the blade. As the inner ends of the blades are held by the pintles, the blades and collar rotate as a unit about the central shaft in response to the pull of the chains from the drag arms 81; consequently the agitator movement is completely controlled and its action is positive.

An opening 100 at the level of the filter cloth in the shell 51 has a frame 101 surrounding it to furnish adequate seating surface for a door 102, and a gasket 103 fitted in the door contacts with the frame for providing a tight joint. The door can be hinged to the frame, as at 104, and lugs 105 on the door are engaged by bolts hinged to the frame. Additional doors can be provided.

At the level of the filter cloth a sludge outlet 110 is provided. For this purpose an internally threaded nipple 111 is welded to the shell, the shell being preferably strenghened by an additional plate 112. A gate valve 113 is joined to the nipple and an attachment 114 with an auger end 115 is secured in line with the nipple and valve for cleaning out solids that may be deposited therein. An overflow opening 116 prevents filling the shell above the open end of the column 71.

From the filtrate chamber 120 between the bottom 52 and the perforated plate 61 is a vacuum connection 121 above the normal liquid level. A filtrate outlet 122 is inserted at the lowest part of the chamber. With a wet vacuum pump in the line leading from the outlet 122, the connection 121 can be omitted.

Figure 8:
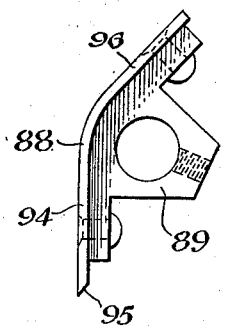
Fig. 8 is an end view of the blade of Fig. 7.
Figure 7:
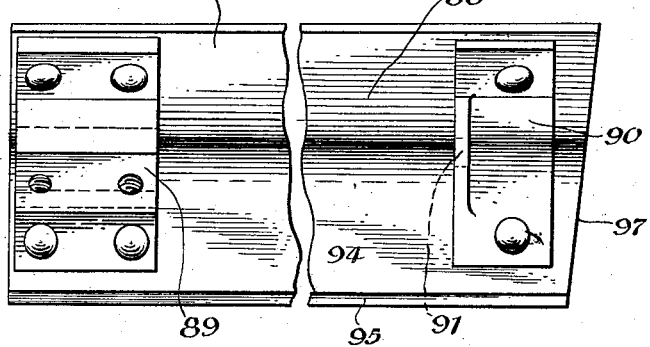
Fig. 7 is a plan view of another form of agitator blade.

In the modified form of blade 88' shown in Figs. 7 and 8, the portions 89', 90', 91', 94', 95' and 97' correspond to the portions 89, 90, 91, 94, 95 and 97, respectively, of Figs. 3 to 6. Instead of the blade portion 96' being curved as is the portion 96 of the blade of Figs. 3 to 6, however, it is also flat like portion 95'; but it is joined to flat portion 94' by a curved portion, so that blade 88' is similar in operation to blade 88.

In the operation of the modified form of filter shown in Figs. 3–6 slurry is fed into the vat, and the filtrate is drawn off through outlet 122. As the cake forms, the arms 81 can be rotated in a direction to drag the agitator bars or blades 88 with the curved portions forward so that the blades rise and ride upon the surface of the precipitate to drag and level the deposited cake and close any cracks or breaks that may occur. While the agitator may be thus rotated during the entire filtering operation, it is preferably operated after the cake has been formed and the filtrate substantially drawn off.

When the filtrate has separated, the cake is ready for washing or removal. For either of these operations the direction of rotation of the blades can be reversed so that the beveled edge cuts into the cake. This action breaks up the cake and simultaneously agitates it. With liquid present, a slurry is thus reformed which can be withdrawn through the sludge opening; or, if liquid has been added for the purpose of washing, the filtrate can be drawn off from the filtrate chamber and the cake reprecipitated. However, instead of reforming a slurry to be reprecipitated, the washing step can be performed with the agitator rotated only as drag to level the cake and remove the cracks or depressions.

For the dragging or smoothing action, the length of the drag chains is properly adjusted, taking into consideration friction, the quality of the filter cake and the weight of the agitator blades and the supporting collar. Preferably the chains are of a length to hang vertically when the blades touch and ride upon the rings 63, 74, which protect the filter cloth from injury by the blades as well as secure the cloth, and to extend in a direction approaching the horizontal when the cake has been built up to the desired thickness, which may be eighteen inches or more, depending on the diameter of the vessel. The length of the chains transmitting the pulling force determines the direction in which the force is applied and consequently the vertical component tending to lift the blades. Accordingly, as the cake builds up, this vertical component becomes less and an increased packing action results.

In the scraping or disintegrating of the cake, the magnitude of the lifting component of the chain pull becomes greater as the blades approach the bottom due to the chains approximating the vertical position. But the bite, or extent to which the blade enters the cake is largely determined by the inclination given to it and the resistance offered by the cake. Since the blade surface is not a true helical one, but one in which all its straight-line elements are parallel to each other, and since the outer end of the blade traverses a helix of large diameter while the inner end traverses a helix of substantially the same pitch but of small diameter, the outer end tends to dig in faster than the inner end. The result is that the inner portion checks the advance of the outer portion into the material, and the tendency for the blade to burrow itself into the material is thus prevented.

The blade formation is susceptible to various changes from substantially a horizontal plane to one of considerable curvature and inclinations, the object in view being a blade so formed and inclined that it operates satisfactorily as a drag in one direction of rotation and breaks up cake in a desired fashion or causes agitation during the reverse direction of rotation. The character of the cake, whether of a slimy or sandy nature, and the force applied are to some extent determinative of these factors of curvature and inclination, particularly the latter; but blades of a curved and angular cross section and having a substantially flat bottom surface with one longitudinal edge rounded and the other longitudinal edge bevelled, as shown and slightly inclined to the horizontal are found to operate quite generally on various cakes, whether slimy or sandy, with satisfaction.

Because of the tangentially offset pintles, the blades do not lie on radial lines. With each blade so mounted that the beveled edge is at the greatest distance from the radial line, a shearing action is imparted during the scraping, and the following upright portion of the blade contacts with the dislodged material to give it a movement toward the vessel periphery and thus to the discharge opening or slurry outlet. No objectionable action results if, in the reverse rotation for the smoothing or dragging operation, the contacting surface is so offset from the radial line that there is a tendency to force material inward, as any accumulation about the shaft axis lifts the drag and so concentrates the leveling action on the accumulated material until the cake is again at a uniform level. It follows, therefore, that the blade can have its inner end offset to any convenient extent irrespective of the blade dimensions.

The central column enclosing the shaft can be omitted with the agitator collar in direct contact with the shaft, and any suitable bearing or support can be substituted for the member 53 or it may be omitted entirely. The column prevents access of sludge or solids to the bearing surfaces, and a bearing for the lower end of the shaft is preferred to add rigidity. The agitator can obviously be varied in number of blades or in construction, for instance, an integral blade and collar structure bored to slide on the shaft or column can be substituted; separable blades, however, are deemed preferable as adjustment of the blade position or angle of inclination is then possible.

While primarily intended for use in filters and so disclosed, the agitator is obviously applicable to vessels of any kind where the functions above described are desirable.

What is claimed is:

1. Apparatus comprising in combination a vessel, a shaft supported within said vessel, an arm extending from said shaft, an agitator slidable along and around said shaft, said agitator including a bar, and flexible means connecting said arm and said bar.

2. Apparatus comprising in combination a vessel, a shaft supported within said vessel, an arm extending from said shaft, an agitator slidable along said shaft, said agitator including a blade having dragging means on one side and scraping means on the other, flexible means connecting said arm and said blade, and means for rotating said shaft in one direction for a dragging operation and in the reverse direction for a scraping operation.

3. A filter comprising in combination a vessel, a filtering bottom in said vessel, and a controlled rotatable agitator in said vessel, said agitator having means for dragging cake in one direction of rotation, and means for scraping cake in the reverse direction of rotation.

4. A filter comprising in combination a vessel, a filtering bottom in said vessel, and a controlled rotatable agitator in said vessel movable toward and away from said bottom, said agitator having means for dragging cake in one direction of rotation, and means for scraping cake in the reverse direction of rotation.

5. In an agitator the combination comprising a member concentrically mounted about a shaft, a pintle extending tangentially from said member, and a blade adjustably mounted on said pintle.

6. In an agitator the combination comprising a member concentrically mounted about a shaft, a pintle extending from said member, and a blade angularly adjustable on said pintle.

7. In an agitator the combination comprising a rotatable and vertically slidable member, and blades pivotally mounted upon, and extending tangentially in symmetrical disposition from said member.

8. In an agitator the combination comprising a blade, drag means on one side of said blade, scraping means on the other side of said blade, and means for bringing either side into operation.

9. An agitator blade comprising an angle-bar adapted to be mounted in a horizontal position and having a substantially flat under surface, said bar being of curved and angular cross-section, and means for pivotally mounting said blade upon a supporting member.

10. A substantially straight agitator blade comprising an angle-bar adapted to be mounted in a horizontal position and having an under surface of which one portion is substantially flat and of which another portion is curved in cross-section, means at one end of said blade for pivotally mounting it upon a supporting member, and means for connecting said blade with a controlling means.

11. In a filter, an agitator adapted to drag precipitate when moved in one direction and adapted to scrape precipitate when moved in the opposite direction, and flexible means for controlling the movement of said agitator.

12. In a filter, a filtering vessel, a filter bottom in said vessel, a shaft within said vessel, a member concentrically mounted on said shaft, and an agitator blade mounted on said member tangentially to said shaft, said agitator blade being adapted to drag precipitate when moved in one direction and to scrape precipitate when moved in the other direction.

13. In a filter, an agitator blade adapted to move in contact with deposited precipitate, said blade upon being moved in one direction being adapted to drag precipitate and when moved in the opposite direction to scrape precipitate, said blade being angular in cross-section and having a substantially flat bottom surface.

14. In a filter, an agitator adapted to drag precipitate when moved in one direction and adapted to scrape precipitate when moved in the opposite direction, said agitator automatically reversing its action with a change in direction of movement, and flexible means for controlling the movement of said agitator.

15. In a filter, a cylindrical vessel, a filter bottom within said vessel, a shaft axially mounted within said vessel in contact with said bottom, a filter sheet over said bottom, a plate securing said sheet to said bottom around said shaft, a plate securing said sheet to said bottom at the periphery of said sheet, and an agitator blade flexibly mounted to move over said sheet in contact with said plates.

16. In a filter, a filtering vessel, a shaft supported within said vessel, a member slidable along and around said shaft, a pintle on said member, and an agitator blade pivotally mounted at one end on said pintle, said blade being angular in cross-section and having a substantially flat bottom surface.

17. In a filter, a filtering vessel, a shaft supported within said vessel, a member slidable along and around said shaft, and a rotatable agitator blade pivotally mounted on said member, said blade being adapted to drag precipitate when moved in one direction and to scrape precipitate when moved in the opposite direction, and said blade automatically reversing its action with a reversal of its direction of rotation.

18. In a filter, a filtering vessel, a filter bottom within said vessel, a shaft supported within said vessel, a rotating member concentric with said shaft, a rotating arm mounted on said member, a collar loosely mounted on said shaft, an agitator blade mounted on said collar tangentially to said shaft, said blade being adapted to drag precipitate when moved in one direction and to scrape precipitate when moved in the opposite direction, and a flexible connection between said arm and said blade.

19. In a filter, a filtering vessel, a filter bottom within said vessel, a hollow shaft within said vessel, a rotating shaft within said hollow shaft and having a portion projecting beyond said hollow shaft, a rotating arm mounted on the projecting portion of said rotating shaft, a collar loosely mounted on said hollow shaft, a pintle on said collar, an agitator blade pivotally mounted at one end on said pintle, said blade being angular in cross-section and having a substantially flat bottom surface, and a chain connecting said arm to the free end of said blade.

20. In a filter, a filtering vessel, a filter bottom in said vessel, a shaft within said vessel, a rotating member concentric with said shaft, a rotating arm mounted on said member, a collar loosely mounted on said shaft, an agitator blade mounted on said collar, and a flexible connection between said arm and said blade.

21. In a filter, a filtering vessel, a filter bottom within said vessel, a hollow shaft within said vessel, a rotating shaft within said hollow shaft and having a portion projecting beyond said hollow shaft, a rotating arm mounted on the projecting portion of said rotating shaft, a collar slidable along and around said hollow shaft, a pintle mounted on said collar tangentially to said shaft, an agitator blade pivotally mounted at one end on said pintle, said blade being adapted to drag precipitate when moved in one direction and to scrape precipitate when moved in the opposite direction, said blade being angular in cross-section and having a substantially flat bottom surface, and a flexible connection between said arm and the free end of said blade.

22. A filter comprising in combination a vessel, a filtering bottom in said vessel, and a rotatable agitator in said vessel movable toward and away from said bottom, said agitator comprising an angle-bar having an under surface of which one portion is substantially flat and of which another portion is curved in cross-section, wherby said agitator is adapted to drag precipitate when rotated in one direction and to scrape precipitate when rotated in the opposite direction.

In testimony whereof we affix our signatures.

JOS. E. JEWETT.
CLARK C. HERITAGE.
RIEWEN RIEGLER.